United States Patent [19]
Dean

[11] Patent Number: 5,885,644
[45] Date of Patent: *Mar. 23, 1999

[54] GARLIC SAUCE AND METHOD OF PREPARATION

[75] Inventor: Michelle D. Dean, Austin, Tex.

[73] Assignee: Mamo's Corporation, Austin, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 609,221

[22] Filed: Mar. 1, 1996

[51] Int. Cl.$^6$ ....................................................... A23L 1/36
[52] U.S. Cl. ......................... 426/632; 426/629; 426/638; 426/589
[58] Field of Search .................................. 426/629, 638, 426/632, 589

[56] References Cited

PUBLICATIONS

Nancy B. Hall, Garlic Sauce Recipe, *Southern Living*; vol. 27, No. 3, Mar. 1992, pp. 141–142, Birmingham, Alabama.
Katherine Pappas, Skordalia Greek Garlic Sauce Recipe, *The Garlic Lover's Cookbook*, from Gilroy, Garlic Capital of the World; p. 131, © 1980, 1982, by the Gilroy Festival Assoc., Inc., Berkeley, CA (Author unknown), Greek Garlic Sauce Recipe, *Cooking for the Weekend*; Company on Saturday Night, p. 93, Copyright © 1993 by Michael McLaughlin, Simon & Schuster, New York, NY.
Rose Dosti, Garlic Suace Skordalia (Greece) Recipe, *Middle Eastern Cooking*, p. 54, © 1982 Fisher Publishing Inc., HB Books, Tucson, AZ.
Carol Truax, Broled Fish Steaks with Garlic–Lemon Sauce Recipe, *The Woman's Day Book of Thin Italian Cooking*, p. 109, Copyright © 1978 by CBS Publications, USA.
Harry G. Nickles, Taratoor Sesame Sauce Recipe, *Middle Eastern Cooking*, p. 112, © 1969 Time, Inc., Time–Life Books, New York.
The Recipe Club of Saint Paul's Greek Orthodox Cathedral, Garlic Sauce With Walnuts, *The Complete Book of Greek Cooking*, p. 178, © 1990, Harper & Row Publishers, New York.
Skordalia Greek Garlic Sauce Recipe, *The Garlic Lover's Cookbook*, from Gilroy, Garlic Capital of the World; Celestial Arts, Berkeley, CA p. 131 (1982).
Broiled Fish Steaks with Garlic–Lemon Sauce Recipe, *The Woman's Day Book of Thin Italian Cooking*, C. Truax; p. 109 (1978) Houghton Mifflin Co. Boston, Mass.
Taratoor Sesame Sauce Recipe, *Middle Eastern Cooking*, H.G. Nickles; Time Life Books, N.Y., p. 112 (1969).
Garlic Sauce With Walnuts, *The Complete Book of Greek Cooking*, The Recipe Club of Saint Paul's Greek Orthodox Cathedral, Harper & Row, Publishers, N.Y. p. 178 (1990).
Tselementes, N. 1952. *Greek Cookery*, D.C. Divry, Inc., N.Y, p. 30.
Boxer, A. 1947. *Nature's Harvest*, Henry Regnery Co., Chicago, IL. pp. 141, 142.
Cutler, Carroll, 1973. Haute Cuisine for your Heart's Desire, Crown Publishers, N.Y., pp. 247, 248.

*Primary Examiner*—Helen Pratt
*Attorney, Agent, or Firm*—Ross Spencer Garsson; Barry S. Newberger; Winstead Sechrest & Minick P.C.

[57] ABSTRACT

A garlic sauce includes garlic, slivered nuts, vinegar, water, oil, and salt. These ingredients are combined without the addition of exogenous starch. A method of preparing the garlic sauce includes preconditioning nuts with garlic by dry blending to form a substantially homogeneous dough-like mixture, mixing vinegar, water, and salt into the dough-like mixture to form a substantially homogeneous batter, and adding oil to the dough to form a uniformly chunky, crunchy, and spreadable sauce with a rich golden hue.

23 Claims, No Drawings

GARLIC SAUCE AND METHOD OF PREPARATION

BACKGROUND OF THE INVENTION

This invention relates to preparing a starchless garlic sauce.

Garlic sauces have a wide variety of culinary uses, including use as: an ingredient in recipes for vegetables, meats and pastas; as toppings or spreads; and as basting solutions. Garlic sauces are characterized, in part, by their particular flavor and/or texture.

Some of the prior art garlic sauces are not spreadable because of their runny consistency which is similar in consistency to salad dressing. This runny consistency is therefore not suitable for spreading on a cracker or for dipping vegetables. Other recipes include a starch, e.g., bread or potato, which diminishes or obscures the nut and garlic flavor of the sauce. The starch containing sauces of the prior art have a bread-like taste and a pasty or starchy texture that imparts a gooey or tacky texture to the sauce. Several other recipes have a pungent, bitter, tart or vinegary flavor that detracts from the enjoyment of the natural flavor of garlic. The colors of prior art garlic sauces vary, for example, from white, almost white, to a grey, purplish, "dirty water" color. These color variations will also detract from the overall visual presentation of the sauce.

SUMMARY OF THE INVENTION

In general, in one aspect, the invention features a garlic sauce including garlic, nuts, vinegar, water, oil, and salt. These ingredients are combined without the addition of exogenous starch.

Implementations of the sauce may include one or more of the following features. The sauce may include almonds; natural creamy white, blanched slivered almonds having a maximum moisture content of about 5.5%; balsamic vinegar; purified water; extra virgin olive oil; and sea salt. The sauce may include, by weight, about 16% garlic, about 27% nuts, about 11% vinegar, about 20% water, about 25% oil, and about 1% salt. The nuts may be preconditioned with the garlic by dry blending.

In general, in another aspect, the invention features a garlic sauce including essentially garlic, almonds, balsamic vinegar, purified water, extra virgin olive oil, and sea salt.

In general, in another aspect, the invention features a method of preparing a garlic sauce. The method includes the steps of preconditioning nuts with garlic by dry blending to form a substantially homogeneous dough-like mixture, mixing vinegar, salt, and water into the dough-like mixture to form a substantially homogeneous batter, and adding oil to the dough to form a uniformly chunky, crunchy, and spreadable sauce with a rich golden hue.

Implementations of the method may include one or more of the following features. The sauce may include almonds; natural creamy white, blanched slivered almonds having a maximum moisture content of about 5.5%; balsamic vinegar; purified water; extra virgin olive oil; and sea salt. The sauce may include, by weight, about 16% garlic, about 27% nuts, about 11% vinegar, about 20% water, about 25% oil, and about 1% salt. The nuts may be preconditioned with the garlic by dry blending.

In general, in one aspect, the invention features a garlic sauce prepared by preconditioning nuts with garlic by dry blending to form a substantially homogeneous dough-like mixture, mixing vinegar, salt, and water into the dough-like mixture to form a substantially homogeneous batter, and adding oil to the dough to form a uniformly chunky, crunchy, and spreadable sauce with a rich golden hue.

In this invention, "precondition" or "preconditioned" or "preconditioning" (all used interchangeably herein) means to prepare by processing for use.

Dry blending means mixing ingredients without the addition of a liquid.

Preconditioning of the nuts with garlic provides concentrated garlic oil saturation of the nuts and significantly improves the flavor of the sauce invention. The absence of starch, e.g., bread or potato, in the instant garlic sauce avoids the dilution of the garlic oil and modification of the garlic flavor, thus, resulting in an improved concentration of garlic oil and garlic flavor in the preconditioned nuts. Preconditioning of the nuts by dry blending with garlic to form a dough-like mixture avoids a mayonnaise-like texture and results in the uniform, chunky, crunchy texture of the garlic sauce which is evenly spreadable. The claimed garlic sauce has a rich golden hue, a nutty, sweet, and garlic flavor with a crunchy texture. In the instant invention, cooking with the garlic sauce bakes the garlic flavor into the topped product and leaves a crunchy, nutty residue on top of the product. Balsamic vinegar provides a robust sweet/sour taste and avoids the chalky, tart, and bitter tastes associated with other vinegars.

Other advantages and features will become apparent from the following detailed description of the invention.

DETAILED DESCRIPTION

This invention is a starchless garlic sauce and method of preparation.

The ingredients for the preferred embodiment of the instant garlic sauce invention include, generally, garlic, nuts, vinegar, water, oil, and salt.

In the preferred embodiment of this invention, whole peeled garlic is used. The whole garlic cloves are peeled, washed using a 3 parts per million solution of sodium hypochlorite and water for microbial inhibition, cooled to 42° F. and packaged. The garlic cloves may then be stored at constant refrigeration at 34° F. to 42° F. until used. Whole garlic from Christopher Ranch is preferred (305 Bloomfield, Gilroy, Calif. 95020).

In the preferred embodiment of this invention, almonds are used. Although any type of almond may be used, it has been determined that medium, natural creamy white, blanched slivered almonds having a maximum moisture content of about 5.5% are preferred. The slivers are preferably firm and crisp with an abundant almond flavor and have specific thickness ranging from about $16/100$" to $18/100$", with $17/100$" being the optimal and preferred thickness. A minimum of 70% of the product is whole slivers and 30% are broken slivers (but not almond "meal"). Approximately 2% of the broken pieces are the round ends of the almonds ("slabs") and 8% of the broken pieces are ½ sliver ("crosscuts"). Almonds are available from a wide range of commercial sources, but almonds from "The Vending Nut Company", American Roland, 622 Pedernales St., Austin, Tex. 78702, are preferred.

In the preferred embodiment of this invention, balsamic vinegar is used. Balsamic vinegar is preferred over other types of vinegar because of its enhanced, rich flavor and taste. Many different balsamic vinegars are commercially available; however, premium, aged imported balsamic vinegar (imported from Modena, Italy) (American Roland, 622

Pedernales St., Austin, Tex. 78702) is preferred. This balsamic vinegar is prepared from the same type of grapes used to make Lambrusco wine. For this balsamic vinegar, the must from the trebbiano grapes (American Roland, 622 Pedernales St., Austin, Tex. 78702) is boiled slowly to sterilize and concentrate the sugar. The must sugar is then transferred to large barrels to which some vinegar and vinegar mother (a cultivated starter) is added. The preferred balsamic vinegar is aged 5 years in red oak kegs, transferred to chestnut barrels, and then transferred to mulberry barrels. Each stage is used to age and mellow the vinegar, by which a warm, red/brown hue and rich aroma is achieved. The resulting balsamic vinegar is deep in color having the consistency of a very thin syrup with a complex, full, mellow sweet-and-sour taste and a heady fragrance.

In the preferred embodiment of this invention, a monounsaturated olive oil which is low in cholesterol is used. Extra virgin olive oil imported from Italy (American Roland, 622 Pedernales St., Austin, Tex. 78702) is preferred. Extra virgin olive oil is obtained from the first pressing of tree-ripened olives. This oil contains only 1% acid and is green/gold to a bright green in color. The preferred olive oil has an intense, rich flavor.

For the purpose of this invention, water purified by reverse osmosis is preferred.

Although many different types and kinds of salt are commercially available, sea salt is preferred. Sea salt is believed to bring out a sweet flavor in the garlic, and is obtained by evaporating sea water and then briefly drying the salt in a kiln. Nutritionally, sea salt has traces of a wide variety of minerals and has a higher iodine concentration than mined salt. In addition, sea salt is free of anti-caking additives. Most sea salts are refined to 420 mg sodium per one (1) gram.

The pH of the resulting mixture of these ingredients (see Example 1 below) is approximately 4.62. The mixture is stored in small glass containers and is microbiologically stable at refrigerator temperatures for periods of time up to six months/years. This sauce invention preferably is stored at refrigerated temperatures (e.g., 34° F. to 42° F.).

The sauce of the present invention is starchless. That is, starches are often added to sauces to provide texture and impart a particular starch flavor (e.g., bread or potato flavor). It is believed that by eliminating starch from the sauce of the present invention, there is reduced dilution of the rich flavor of fresh garlic. It is believed that starches absorb the garlic juice and/or alter its distinctive taste and texture. Thus, both the texture and the enhanced garlic flavor of the sauce disclosed herein is obtained, in part, by the specific combination of ingredients and without the addition of starch.

In the preferred form, the sauce has a chunky texture with uniform distribution of pieces of garlic and nuts and has a smooth, spreadable, but not a mayonnaise-like, consistency. The chunky texture results from dry blending the garlic with the nuts. The inclusion of chunks of garlic and nuts in the sauce of the present invention provides a distinct advantage. When one bites down on the sauce or foods garnished with the sauce, the chunks are crushed. Chewing the sauce provides an instant burst of fresh garlic and nut flavor. The invention facilitates the delivery of garlic together with the flavor of preconditioned nuts to yield a significantly improved taste. The process of preparation produces a mixture with a distinctive rich golden hue.

This sauce has an appealing and improved taste and can be used in the preparation of a variety of different foods. For example, the sauce can be used in the preparation of vegetables (e.g., new potatoes, rice, string beans), seafoods (e.g., shrimp, trout, halibut, tuna), meats (e.g., beef, pork, chicken), pasta (e.g., fettucine, spaghetti, lasagna), sandwiches, eggs, sauces, dips, spreads, paté, and pizza.

The sauce as taught in the claimed invention has a unique flavor that is obtained in significant part by preconditioning the almonds with the garlic by dry blending. Chewing the garlic and preconditioned nuts results in an improved flavor and freshness of taste. Thus, the flavor and texture of the instant garlic sauce is unique and improved.

In the following example, a specific preferred embodiment of the process of preparation in accordance with the present invention will be disclosed.

EXAMPLE 1

The following recipe represents the preferred formulation and method of preparation for the starchless garlic sauce of the present invention.

Step 1

Precondition 30 cups of almonds (i.e., about 28% of the sauce by weight) with 5 pounds of garlic (i.e., about 16% of the sauce by weight) by dry blending both ingredients in a Hobart Cutter-Mixer Machine Model HCM 300 equipped with a wire whip stirrer, for 1 minute and 35 seconds to form a substantially homogeneous dough. During the initial preconditioning stage, rotate the Hobart machine mixing handle clockwise 1 spin after approximately 15 seconds and then ¼ spin counter clockwise after approximately 1 second. Dry blending the garlic with the almonds achieves a "blossoming" of the garlic. This preconditions the almonds with the strongest possible garlic flavor and aroma. Preconditioning the almonds with whole garlic cloves provides a richer, more flavorful product. This preconditioning process exposes the freshly blended almonds to full contact with the undiluted, unevaporated garlic juice that is initially released during the dry blending process. It is believed that preconditioning the almonds in this means provides the surprisingly enhanced flavor of this sauce as compared to other garlic sauces.

Step 2

Open the mixer from the top, scrape the bowl and the blade (with a rubber spatula) to reposition all ingredients in the middle of the mixing bowl.

Step 3.

Close the mixer top, spin the mixing handle clockwise 3 times and then counter-clockwise ½ spin until a dough-like texture has been achieved (i.e., approximately 30 seconds).

Step 4

Repeat Step No. 2.

Step 5

Add 48 oz. balsamic vinegar (i.e., about 11% of the sauce by weight), broadcast ⅓ cup salt (i.e., about 1% of the sauce by weight), and slowly add 12 cups water (i.e., about 20% of the sauce by weight) to the preconditioned almonds.

Step 6

Mix 40 seconds to form a substantially homogenous batter.

Step 7

Repeat Step No. 2.

Step 8

Mix for 1 minute, 45 seconds.

Step 9

Add one gallon of extra virgin olive oil (i.e., about 25% of the sauce by weight) while mixing (time required is approximately 38 seconds).

Step 10

After the olive oil has been added, rotate the mixing handle 5 times clockwise very quickly, and 2 times counter-clockwise.

Step 11

Repeat Step No. 2 (i.e., scrape lid, blade and bowl). Mix for 15 seconds. Scrape and pour the sauce into a holding container.

While the invention has been described with reference to a preferred embodiment, it will be understood by those skilled in the art that various changes may be made and equivalents may be substituted for elements thereof without fully departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A garlic sauce, comprising the following ingredients:
   a) garlic;
   b) slivered nuts, wherein at least about 70% of the slivered nuts have a thickness approximately equal to or greater than $16/100''$;
   c) vinegar;
   d) water;
   e) oil; and
   f) salt,
   wherein said ingredients are combined without the addition of exogenous starch.

2. The sauce of claim 1, wherein said slivered nuts comprise slivered almonds.

3. The sauce of claim 2, wherein said slivered almonds comprise natural creamy white, blanched slivered almonds having a maximum moisture content of about 5.5%.

4. The sauce of claim 1, wherein said vinegar comprises balsamic vinegar.

5. The sauce of claim 1, wherein said water comprises purified water.

6. The sauce of claim 1, wherein said oil comprises extra virgin olive oil.

7. The sauce of claim 1, wherein said salt comprises sea salt.

8. The sauce of claim 1, wherein said sauce comprises, by weight, about 16% of said garlic, about 28% of said slivered nuts, about 11% of said vinegar, about 20% of said water, about 25% of said oil, and about 1% of said salt.

9. The sauce of claim 1, wherein said slivered nuts are preconditioned with said garlic by dry blending.

10. A garlic sauce, consisting essentially of:
    a) garlic;
    b) slivered almonds, wherein at least about 70% of the slivered nuts have a thickness approximately equal to or greater than $16/100''$;
    c) balsamic vinegar;
    d) purified water;
    e) extra virgin olive oil; and
    f) sea salt.

11. A method of preparing a garlic sauce, comprising the steps of:
    a) preconditioning slivered nuts with garlic by dry blending to form a substantially homogeneous dough-like mixture having the slivered nuts, wherein at least about 70% of the slivered nuts have a thickness approximately equal to or greater than $16/100''$;
    b) mixing vinegar, salt, and water into said dough-like mixture to form a substantially homogeneous batter; and
    c) adding oil to said substantially homogeneous batter,
    wherein the mixing of the garlic sauce is performed without the addition of an exogenous starch in the garlic sauce.

12. The method of claim 11, wherein said slivered nuts comprise slivered almonds.

13. The method of claim 12, wherein said slivered almonds comprise natural creamy white, blanched slivered almonds having a maximum moisture content of about 5.5%.

14. The method of claim 11, wherein said vinegar comprises balsamic vinegar.

15. The method of claim 11, wherein said water comprises purified water.

16. The method of claim 11, wherein said oil comprises extra virgin olive oil.

17. The method of claim 11, wherein said salt comprises sea salt.

18. The method of claim 11, wherein said sauce comprises, by weight, about 16% of said garlic, about 28% of said slivered nuts, about 11% of said vinegar, about 20% of said water, about 25% of said oil, and about 1% of said salt.

19. The method of claim 11, wherein said slivered nuts are preconditioned with said garlic by dry blending.

20. A garlic sauce prepared by the method of claim 11.

21. The sauce of claim 20, wherein:
    a) the slivered nuts are slivered almonds;
    b) the vinegar is basalmic vinegar;
    c) the salt is sea salt; and
    d) the oil is extra virgin olive oil.

22. A method of preparing a garlic sauce, comprising the steps of:
    a) preparing garlic for mixing with slivered almonds;
    b) preconditioning the slivered almonds with the garlic by dry blending, wherein at least about 70% of the slivered almonds have a thickness approximately equal to or greater than $16/100''$;
    c) mixing basalmic vinegar, sea salt, and water with the dry blended mixture of said garlic and said slivered almond; and
    d) adding extra virgin olive oil to the basalmic vinegar, the sea salt, the water, and the dry blended mixture of said garlic and said slivered almond,
    wherein the mixing of the garlic sauce is performed without the addition of an exogenous starch in the garlic sauce, and
    wherein said garlic sauce comprises, by weight, about 16% of said garlic, about 28% of said slivered almonds, about 11% of said basalmic vinegar, about 20% of said water, about 25% of said extra virgin olive oil, and about 1% of said sea salt.

23. A garlic sauce, comprising the following ingredients:
    a) garlic;
    b) chunks of nuts, each chunk having a maximum dimension approximately equal to or greater than $16/100''$;
    c) vinegar;
    d) water;
    e) oil; and
    f) salt,
    wherein said ingredients are combined without the addition of exogenous starch.

* * * * *